INVENTOR.
Yoji Toyozawa

3,061,939
PRECISE MEASURING METHOD FOR AN INNER DIAMETER OF A CYLINDER
Yoji Toyozawa, 1276 Matsunoki-cho,
Suginami-ku, Tokyo, Japan
Filed Feb. 23, 1960, Ser. No. 10,155
Claims priority, application Japan Feb. 26, 1959
2 Claims. (Cl. 33—178)

The present invention relates to a precise measuring method for measuring an inner diameter of a cylinder.

It is one object of the present invention to provide a precise measuring method which comprises a first piston formed with a short cylindric part finished precisely and formed with guide parts, the outer diameter of the latter being slightly smaller than the diameter of the cylindric part and a second piston having a short cylindric part slightly different in diameter from the cylindric part of the first piston, the first piston and the second piston being alternately inserted into a cylinder to be measured containing a fluid medium therein. Then a load is applied to the corresponding pistons, which load is effective vertically, whereby the pistons are rotated and the time required for the travel of each piston for a predetermined distance is measured, that is, the length of the cylinder, whereupon the inner diameter of the cylinder to be measured is calculated from the measured times independently of the viscosity of the fluid medium and the magnitude of the pressure exerted upon the base surface of any of the pistons.

It is another object of the present invention to provide a measuring method for measuring an inner diameter of a cylinder in a highly precise manner and a relatively easy and effective manner even when the pressure in the cylinder to be measured is held at a very high rate.

It is yet another object of the present invention to provide a measuring method, wherein instead of using two separate pistons having short cylindric parts, a single piston is used, wherein a short cylindric, precisely worked part is spaced apart from a second short cylindrical part, the diameter of which varies slightly from the diameter of the first cylindrical part, at a distance greater than the length of the cylinder, the inner diameter of which is to be measured. The additional measuring process, which covers the dropping times, corresponds with the above described method.

The exact measuring of the inner diameter of a cylinder is occasionally necessary, in case the exact amount of the pressure, which is indicated in a manometer of the weight type is to be determined during the mass-production for precise measuring-devices and -instruments, internal combustion engines, airplanes, etc. It is, however, very difficult, to measure the inner diameter of a cylinder with great exactness and in a simple manner, and in particular not only, if the inner diameter of an elongated cylinder is to be measured, but also if the cylinder is maintained at a high inner pressure. No suitable method is known for this purpose and the problem has not been solved completely in spite of the fact that such method is demanded by all work shops, in order to increase the working precision.

With these and other objects in view, which will become apparent in the following detailed description, the present invention will be clearly understood in connection with the accompanying drawing, in which.

Figure 1:
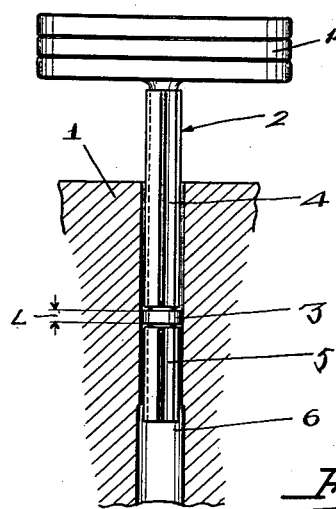
FIGURES 1 and 2 are vertical sectional views of a cylinder, the inner diameter of which is to be measured, whereby the measuring instrument is inserted in a medium disposed in the cylinder.
Figure 3:
FIG. 3 is a cross section of a guide part of the piston, shown in FIGS. 1 and 2.

Referring now to the drawing, and in particular to FIG. 1, a cylinder 1, the inner diameter of which is to be measured, is positioned such that its axis is disposed vertically. A piston 2 is equipped with a short cylindrical and precisely worked part 3, as well as with guide parts 4 and 5, which have a smaller diameter than that of the cylindric part 3. The cylindric part 3 has a diameter $d_1$ and the guide parts 4 and 5 are preferably designed in the form of an oblique start, as may be readily ascertained in the sectional view of FIG. 3, in order to simplify the rotation of the piston 2 by the pressure of the medium.

Upon feeding the fluid medium 6 into the cylinder 1, the piston 2 is inserted into the cylinder 1 by means of a suitable device and is dropped downwardly by the weight of a member 14 at a relatively low speed, while subjected to rotation by the effect of the pressure of the fluid medium 6. In this case, the distance of drop of the piston 2 is measured by a stop clock or any other time measuring instrument, and simultaneously the time period $t_1$ is determined, required for the drop. Then the piston 2 is replaced by another piston 2' (FIG. 2), which has a cylindric part 3', the diameter $d_2$ of which varies slightly from the diameter $d_1$ of the cylindric part 3. The piston 2' is inserted into the cylinder 1 from its top, and the distance of drop the piston 2' and the time period $t_2$ required for the drop of the piston 2' are measured. If now the two pistons 2 and 2' are inserted successively into the cylinder 1, the time period $t_1$ for the drop of the piston 2 and the time period $t_2$ for the drop of the piston 2' can be determined by means of the formula set forth below, wherein the inner diameter of the cylinder 1 is $d$, the outer diameter of the cylindrical part 3 of the piston 2 is $d_1$ and the outer diameter of the cylindrical part 3' of the piston 2' is $d_2$. Furthermore, the viscosity of the fluid medium at a predetermined temperature and a pressure unit is $\eta_0$, a pressure change factor for the viscosity of the fluid medium is $a$, the drop distance of the piston 2 is $(Z_1-Z_0)$, the drop distance of the piston 2' is $(Z_2-Z_0)$ and the length of the cylindric part 3 is L. Finally, the prevailing pressures at the base of the pistons 2 and 2' are $p_1$ and $p_2$, respectively, and a constant is K.

$$t_1 = K \cdot \frac{\eta_0 \cdot d_1 (\log a) \cdot (Z_1 - Z_0) \cdot L}{(d-d_1)^3 \cdot (a^{-p_1} - 1)} \qquad (1)$$

$$t_2 = K \cdot \frac{\eta_0 d_2 \cdot (\log a) \cdot (Z_2 - Z_0) \cdot L}{(d-d_2)^3 \cdot (a^{-p_2} - 1)} \qquad (2)$$

In order to calculate now, for instance, the inner diameter $d$ of the cylinder 1 to be measured by means of the Formula 1, at least the values of $\eta_0$ and $a$ must be known. These values are, however, subject to change in response to the temperature and it is extremely difficult to obtain the values for the actual status of the conditions. This end can be achieved, however, by the present invention without using these values. In the present invention, the pressure $p_1$ and $p_2$ are of course actually equal, if low pressures are involved, yet even if high pressures are involved. Furthermore, the difference between the outer diameter of the cylindrical part 3 of the piston 2 and the outer diameter of the cylindrical part 3' of the piston 2' is so small, that the ratio of the two values is practically one, whereby, if there appears a deviation, the loads of the pistons 2 and 2' are adjusted such that the value one is obtained.

Accordingly, from the Formulas of 1 and 2, the following Formula 3 is obtained:

$$d = d_1 + \frac{d_1 - d_2}{\left[\frac{t_1(Z_2 - Z_0)}{t_2(Z_1 - Z_0)}\right]^{1/3} - 1} \qquad (3)$$

If the time periods $t_1$ and $t_2$ are determined, in the above Formula 3 such, that the same drop distances result for both pistons 2 and 2', the following formula is obtained, if the difference between the outer diameter $d_1$ of the cylindric part 3 and the outer diameter $d_2$ of the cylindric part 3' is very small:

$$d = d_1 + \frac{d_1 - d_2}{(t_1/t_2)^{\frac{1}{3}} - 1}$$

In the above formula, any of $d_1$, $d_2$, $t_1$ and $t_2$ are known and can be inserted at the right side of the formula. The inner diameter of the cylinder 1 can be determined thereby. In this case, the ratio of $t_1$ and $t_2$ is given by a cubic root, so that the values of $t_1$ and $t_2$ do not require an exact measurement relative to the preciseness of the measure of the inner diameter of the cylinder 1. In other words, an error in the measurement of $t_1$ and $t_2$ has a small effect only upon the value of the inner diameter of the cylinder 1 and is relatively small in comparison with errors of $d_1$ and $d_2$. Accordingly, the inner diameter $d$ of the cylinder 1 can be obtained with a high degree of preciseness.

In the mass production of cylinders of pressure measuring devices of the weight type and the like, which are used as a comparative measure for the pressure in a cylinder of a fuel injection pump of an internal combustion engine or as a comparative measure in general pressure measurings, the inner diameters of the various parts can be measured precisely and effectively. Furthermore, instead of the pistons other dropping members can be used, or by changing the loads applied to the pistons, the viscosity of the fluid medium, subjected to high pressure, may be measured.

In the device described above, the piston is inserted into a cylinder containing a fluid medium and is lowered therein. Accordingly, liquids, such as oil, etc. having a lubricating effect, may be used as a fluid medium. In this case, upon slow rotation of the piston in the cylinder, an oil film is formed about the piston, so that the piston floats in the fluid medium, and accordingly, any contact of the piston with the cylinder is entirely avoided and also the piston and the cylinder retain their vertical axes. Furthermore, other media than oil, as other liquids, gases or vapor can be used.

Further, since in accordance with the present invention, the dropping time of one piston and then the dropping time of the other piston, which has a diameter slightly different from that of the first cylindric part and is used alternately with that of the first piston, is applied for the measuring, and further the same cylinder is used during the measuring operation, the dropping times of the two pistons from a common point can be easily determined. The two cylindric parts, having slightly different diameters, are inserted alternately into the cylinder to be measured, whereby the measuring conditions are hardly altered, so that the measuring can be performed exactly.

Nextly, in order to determine the inner diameter of the cylinder, the outer diameter of the cylindric parts must be known, however, this measuring can be performed with great exactness. Even, if the measuring of the dropping times of the pistons is not performed with greater exactness than the measuring of the outer diameters of the cylindric parts, the inner diameter of the cylinder can be determined very exactly. This characteristic is a particular feature of the present invention.

Furthermore, the determination of the dropping times of the two pistons, which are to drop for the same distances, can be obtained very easily. In this case, the preciseness of the dropping times of the pistons may be of the order of about 1/3 of the preciseness of the measuring of the outer diameters of the cylindric parts, so that, accordingly, the inner diameter of the cylinder can be determined simply and precisely. The method according to the present invention has simultaneously the characteristic, that by applying a load to the piston, it is possible to perform the measuring of the inner diameter of a cylinder at high pressure, of an inner diameter of a cylinder having a base face, which is measured with difficulty only by means of an air micrometer and of the viscosity of a fluid medium, whereby the outer diameters of the cylindric parts and generally a clearance between the cylinder and the cylindric part can be applied. For this reason, the present method is of great industrial importance, insofar as the inner diameter of a cylinder can be determined relatively easily and effectively.

A still more effective measuring can be achieved such, that longitudinal slots are provided along the outer surfaces of the guide parts, which longitudinal slots are disposed between projections of the guide parts in such manner, that they have a great depth in the direction of rotation of the piston. One piston may be equipped with two cylindrical parts, the diameter of which varies slightly and which are spaced apart at a distance which is larger than the length of the cylinder to be measured.

Figure 4:
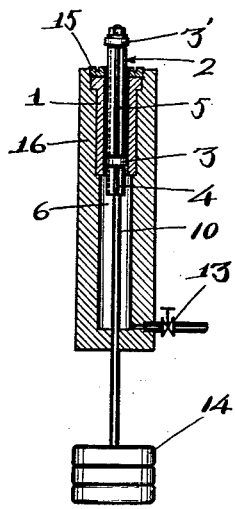
FIGS. 4 and 5 are vertical sectional views of additional embodiments used for carrying out the method of the present invention.
Figure 5:
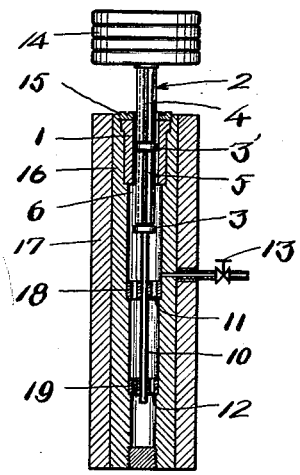

FIGS. 4 and 5 disclose two embodiments of such structures.

In accordance with FIGS. 4 and 5, two cylindrical parts 3 and 3', having slightly different diameters, are formed on a piston 2. The distance between the cylindrical parts 3 and 3' is chosen such, that it is slightly greater than the length of the cylinder 1 to be measured. The guide parts 4, 5 and 10 are clearly disclosed in the drawing. FIG. 5 also shows clearly the passages 11 and 12 for the fluid medium 6, which become effective during the raising and lowering of the piston 2.

As may be ascertained from FIGS. 4 and 5, a needle valve 13 controls the feed of the medium into the cylinder 1. A weight 14 is adapted to apply a load upon the piston 2. A press cover 15 is provided, by which the cylinder 1 to be measured is pressed toward a receiving cylinder 16. An outer cylinder 17 (FIG. 5) serves the purpose of reinforcing the receiving cylinder 16. Guide seats 18 and 19 for the guide part 10 are arranged, which guide seats 18 and 19 have bores 11 and 12, respectively, extending therethrough for feeding the fluid medium 6.

Figure 2:
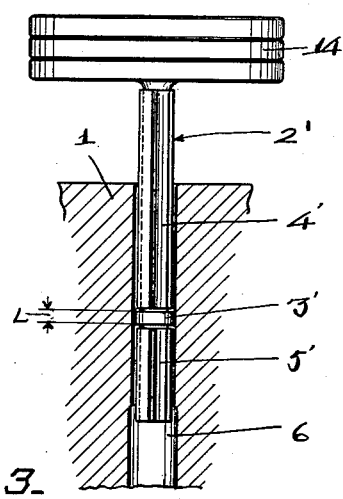

In these embodiments, instead of using two pistons, as disclosed in FIGS. 1 and 2, one piston 2 having two cylindric parts 3 and 3' of different diameters, is used. Consequently, the measuring operations are effected successively in the same manner, as in the previous method, in connection with the embodiments disclosed in FIGS. 1 and 2.

Due to these modifications, the times required for the drop of the cylindric parts 3 and 3' through a definite length are measured successively, and thus a mode of operation is obtained, which is independent from the viscosity of the fluid medium and the pressure pervailing at the base surface of the piston. The inner diameter of the cylinder can be calculated and exactly determined from the dropping times with the above stated formula.

In accordance with the present invention, the inner diameter of a cylinder can be deduced from a dropping movement of a piston, without changing the measuring conditions, so that the measuring operation can be performed effectively. In the present method, the inner diameter of a cylinder is absolutely exactly determined, so that the industrial application can be expanded by combination of this method with the use of an air micrometer.

In addition, in industrial measurements, for instance, of a fuel injection pump in a diesel engine or a cylinder of a pressure measuring device, the measurings are limited to the use of a few inner diameters of one type or of one cross-section of a cylinder with a view for mass production, so that the use of a small number of pistons turns out to be vary advantageous for the use of the method.

The exactness in previous measurings of the inner diameter of a cylinder is of the order of ±1μ. In modern industrial measurings, however, an exactness of measuring the inner diameter of the cylinder is required of the order of ±0.1 to ±0.2μ, in order to bring about, for instance, a precise fitting of a piston in a cylinder.

This requirement can be satisfied sufficiently, so as to obtain a highly precise inner diameter of a cylinder. In accordance with the present method, the difference of the diameters of two cylindric parts is of a sufficient value and the difference between an outer diameter of the larger cylindrical part and an inner diameter of the cylinder to be measured is made as small as possible as within the permissible conditions, so that a precise measuring of the inner diameter of the cylinder can be performed and also the eccentricity of the axes of the piston and of the cylinder to be measured is so small, that it does not interfere with the exactness of the measing of the inner diameter of a cylinder to be measured. The above facts have been established theoretically and practically and assure that the method of the present method for measuring the inner diameter of a cylinder, permits wide industrial application.

While I have disclosed several embodiments of the present invention, it is to be understood that these embodiments are given by example only and not in a limiting sense, the scope of the present invention being determined by the objects and the claims.

What I claim is:

1. A method of exactly measuring the inner diameter of a cylinder filled with a medium by means of two pistons, each of said pistons having a short cylindrical member of a diameter slightly different from that of said other short cylindrical member, comprising the steps of inserting said pistons alternately into said cylinder to be measured, applying a load to said pistons, effective in vertical direction, simultaneously subjecting said pistons to rotation during the downward movement thereof in said cylinder to be measured, and measuring the time periods required for each of said pistons to move downwardly for a length corresponding with the length of said cylinder to be measured, the resulting time periods being adapted to calculate exactly the inner diameter of said cylinder independently from the viscosity of said medium and from the value of the pressure exerted upon the base face of each of said pistons.

2. A method of exactly measuring the inner diameter of a cylinder filled with a medium by means of a piston having a first cylindrical exactly worked part and a second cylindrical part of a diameter slightly smaller than that of said first part, comprising the steps of inserting said piston into said cylinder to be measured, causing successive entrance of said cylindrical parts into said cylinder, applying a load to said piston, whereby said piston is subjected to rotation, and measuring the time periods required for said cylindrical parts to move downwardly for a length corresponding with the length of said cylinder, the resulting time periods being adapted to calculate exactly the inner diameter of said cylinder independently from the viscosity of said medium and from the value of the pressure exerted upon the base face of said piston.

References Cited in the file of this patent

UNITED STATES PATENTS

| | | |
|---|---|---|
| 295,093 | Ashcroft | Mar. 11, 1884 |
| 1,919,546 | Fletcher | July 25, 1933 |